(12) United States Patent
Sporn

(10) Patent No.: US 7,387,088 B2
(45) Date of Patent: Jun. 17, 2008

(54) RESILIENT SMALL ANIMAL HARNESS

(76) Inventor: Joseph S. Sporn, 274 W. 86th St., New York, NY (US) 10024

( * ) Notice: Subject to any disclaimer, the term of this patent is extended or adjusted under 35 U.S.C. 154(b) by 185 days.

(21) Appl. No.: 11/201,677

(22) Filed: Aug. 12, 2005

(65) Prior Publication Data

US 2007/0034164 A1 Feb. 15, 2007

(51) Int. Cl.
*A01K 27/00* (2006.01)
(52) U.S. Cl. .................... 119/856; 119/792
(58) Field of Classification Search ............ 119/771, 119/792, 856, 863, 858, 850; D30/152
See application file for complete search history.

(56) References Cited

U.S. PATENT DOCUMENTS

| | | | | |
|---|---|---|---|---|
| 2,233,397 | A * | 3/1941 | Bloom | 119/857 |
| 5,119,767 | A * | 6/1992 | Jimenez | 119/770 |
| 5,146,875 | A * | 9/1992 | Bolt | 119/654 |
| 5,676,093 | A * | 10/1997 | Sporn | 119/792 |
| 5,913,285 | A * | 6/1999 | Pritchard | 119/771 |
| 6,101,979 | A * | 8/2000 | Wilson et al. | 119/725 |
| 6,367,583 | B1 * | 4/2002 | Derby | 182/3 |
| 6,827,044 | B2 * | 12/2004 | Lobanoff et al. | 119/771 |

FOREIGN PATENT DOCUMENTS

| | | | |
|---|---|---|---|
| GB | 2319161 A | * | 5/1998 |
| JP | 2005261409 A | * | 9/2005 |
| WO | WO 2005117572 A1 | * | 12/2005 |

* cited by examiner

*Primary Examiner*—Son T. Nguyen
(74) *Attorney, Agent, or Firm*—Richard W. Hanes; January D. Barrett; Hanes & Schutz, LLC

(57) ABSTRACT

A small animal harness comprising an elastically deformable chest piece that attaches at its upper portion to a pair of flexible shoulder straps and attaches at its lower portion to a pair of flexible brisket straps, the unattached ends of the shoulder and brisket straps being interconnected over the withers of the animal so that the brisket straps are slidable in the connection and adapted to be connected to a leash for control of the animal.

6 Claims, 5 Drawing Sheets

RESILIENT SMALL ANIMAL HARNESS

FIELD OF THE INVENTION

The present invention relates generally to harness apparatus for small animals, including canines and cats.

BACKGROUND OF THE INVENTION

The prior art has seen a large number of innovative designs for pet harnesses and restraints. All of the designs attempt to provide comfort for the animal consistent with adequate control. Many of the designs utilize a chest pad or chest strap in combination with shoulder straps and girths that converge over the withers to form a connection point for a leash or other type of securing device.

Typical of patents disclosing such apparatus are the following:

U.S. Pat. No. 5,915,335 for Dog Car Restraint, issued Jun. 29, 1999;

U.S. Pat. No. 6,101,979 for Adjustable Safety Pet Harness issued Aug. 15, 2000; and U.S. Pat. No. 6,694,923 for Pet Harness With Quick Connect Stand-Up Leash.

The apparatus disclosed by these patents, as well as other known prior art, are constructed from flexible but non-elastic straps and pads that, even though adjusted to fit a particular animal, inherently impose elements of discomfort and undue restriction during certain movements or animated motion of the animal.

Accordingly, it is the primary object of the present invention to provide a harness for small animals that will accomplish the traditional control objectives while at the same time providing the resilience necessary to eliminate body pressure points and relieve needless restriction of movement when the animal is active.

SUMMARY OF THE INVENTION

The focus of the present invention in a small animal harness is the provision of an elastically deformable chest pad that is interconnected to one end of each of a pair of shoulder straps and to one end of each of a pair of brisket straps. The other ends of the shoulder straps and distal loop of the brisket straps converge over the animal's withers to form an attachment point for a leash or similar restraint. Longitudinal and diagonal elasticity of the chest pad allows the pad to distort during walking, running or other activity of the animal. Being capable of significant distortion from forces imposed on the connecting straps, the chest pad allows virtual expansion and contraction of the shoulder and brisket straps to accommodate the changing anatomical features of the animal during vigorous activity. Such continual self adjustment avoids undesirable strap pressure on body elements and precludes the restriction of movement that is inherent in traditional harnesses.

DETAILED DESCRIPTION OF PREFERRED EMBODIMENT

Figure 1:
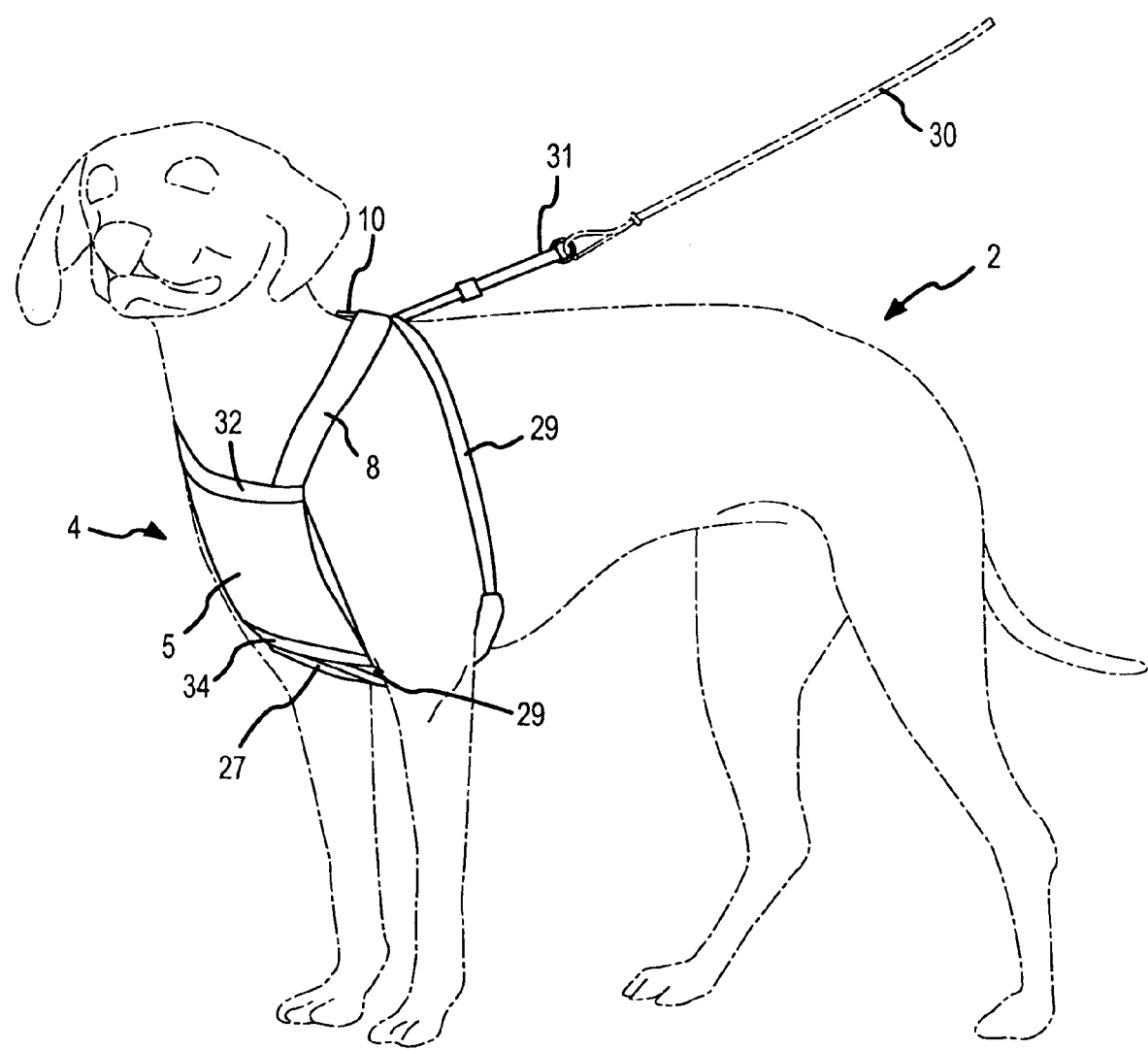
FIG. 1 is a perspective view of a dog wearing the harness of the present invention.

Referring first to FIG. 1, an exemplary dog 2 is shown wearing the elastic harness 4 of the present invention. The harness includes a deformable elastic chest piece, or pad, 5 that is adapted to be positioned over the chest of the dog 2. A pair of shoulder straps 6 and 8 is disposed over the respective shoulders of the dog with their distal ends 7 and 9 connected to a withers plate 10 (See FIGS. 2, 3 and 4). The proximal ends of the shoulder straps are respectively sewn to laterally spaced-apart attachment points 12 and 15 disposed on the upper corners of the chest pad 5.

Connected to laterally spaced-apart connecting points 19 and 21 on the lower corners of the chest pad 5 are the respective proximal ends 23 and 25 of a pair of brisket straps 27 and 29. The brisket straps are adapted to be positioned in the respective crotches of the forelimbs of the dog and preferably are equipped with sherpa sleeves or other suitable padding. The distal loop 28 of the briskets straps runs through an aperture 60 in the withers plate 10 and forms a connecting point 31 for a leash 30 or other restraint. The sliding movement of the brisket straps 27 and 29 within the aperture 60 provides a means for the handler to pull tension on the leash and thereby virtually shorten the brisket straps within the harness to bring pressure to bear on the crotches of the dog's forelegs in order to assert control.

As the dog moves in a walking gait one shoulder will be somewhat advanced over the other shoulder. Such displacement will be even more pronounced when the dog is running or performing other vigorous exercise. Traditional harnesses do not easily accommodate such distortion of the body, resulting in increased pressure on a shoulder, leg or chest portion or even restriction of movement.

Figure 2:
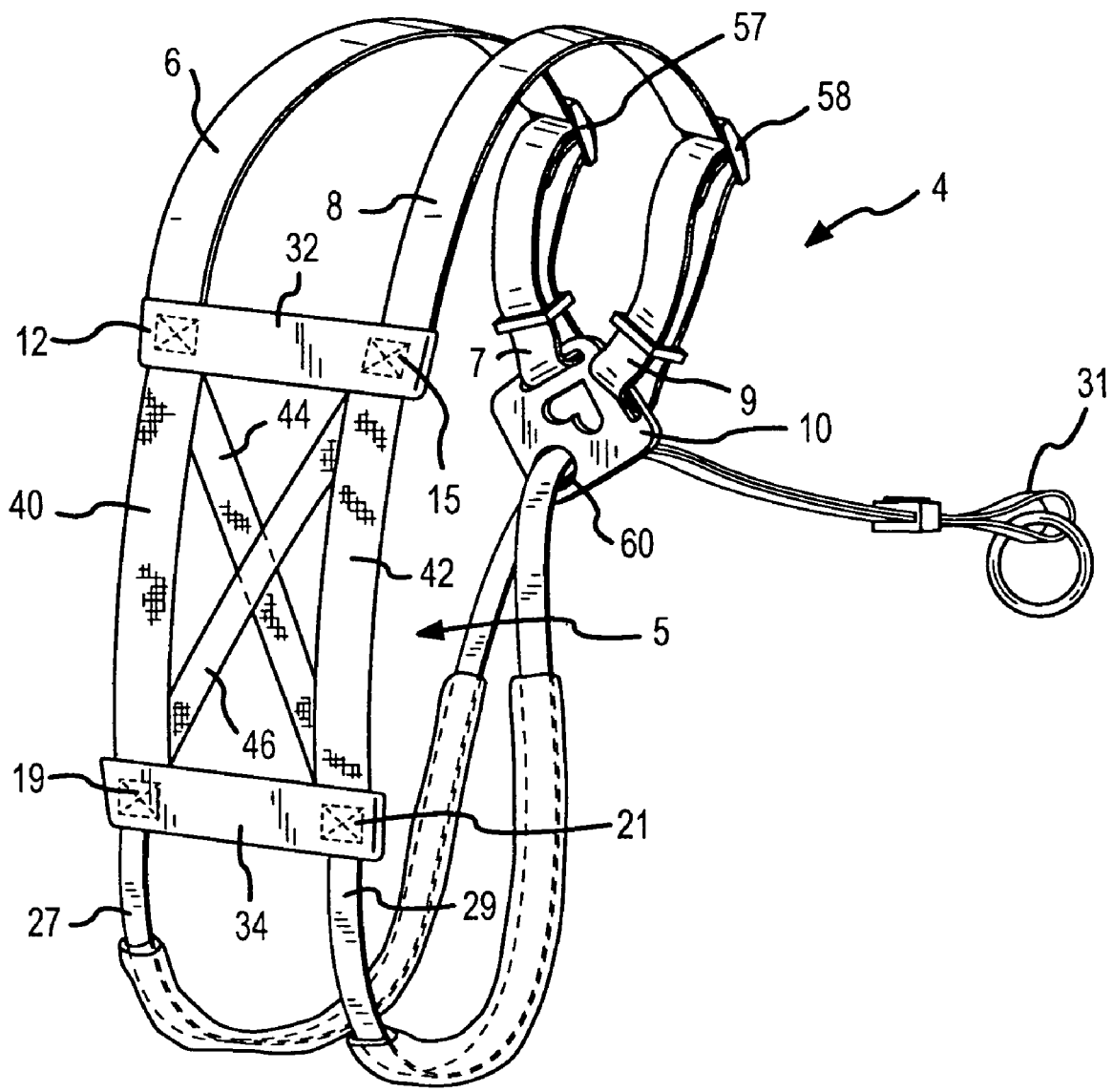
FIG. 2 is a perspective view of the harness especially illustrating the interior band construction of the harness' elastic chest pad and showing the shoulder and brisket straps.
Figure 3:
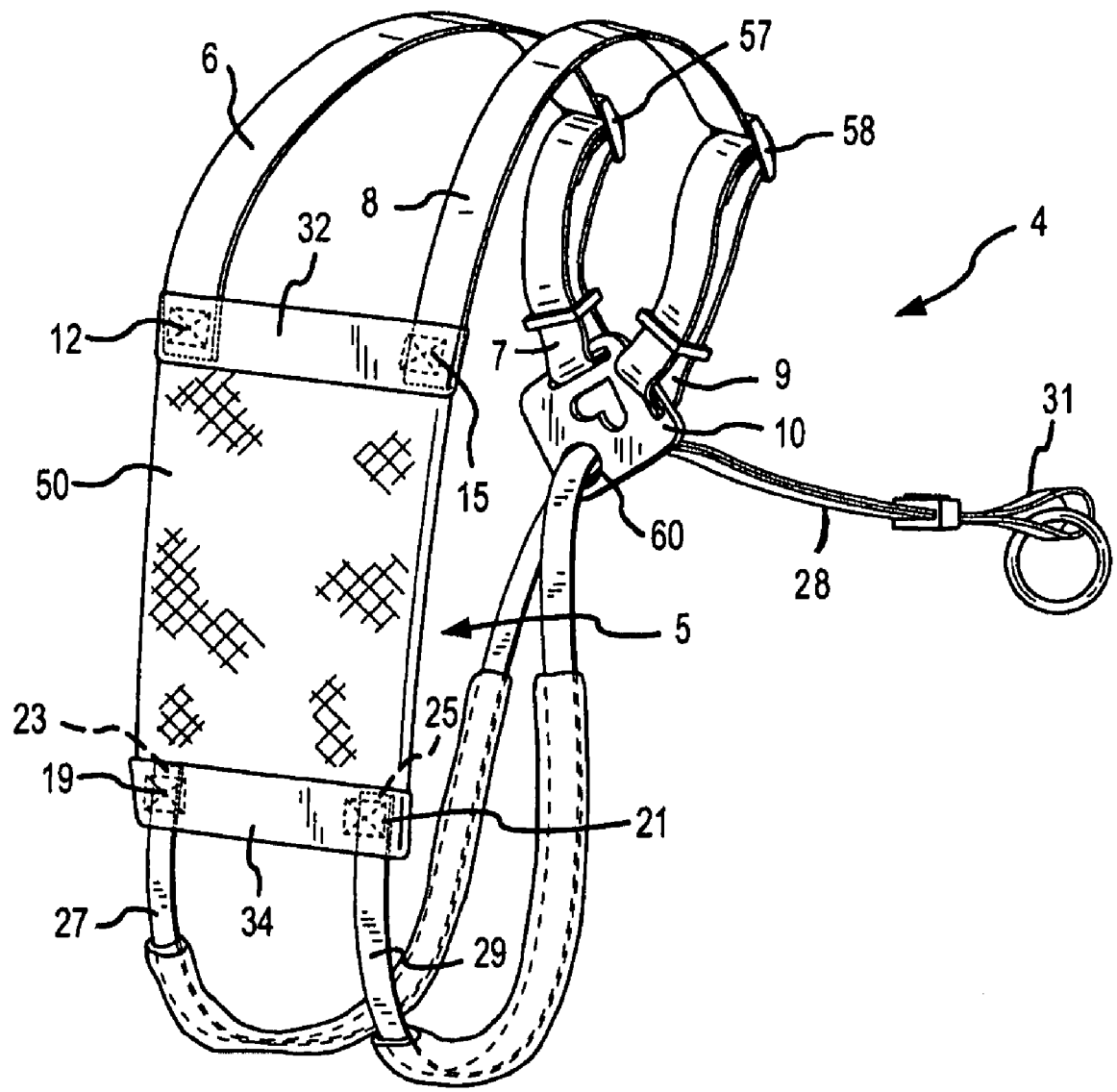
FIG. 3 is similar to FIG. 2 but illustrating the exterior mesh jacket that encompasses the interior bands that comprise the interior of the chest pad.

The prevention of such increase in pressure and restriction of movement is accomplished with the use of the substantially deformable chest pad 5 in the harness of the present invention. Elasticity of the pad is achieved by the elastic bands shown in FIG. 2. While a number of different pad configurations are possible, the one shown in FIG. 2 is preferred. In this arrangement the pad comprises a longitudinally spaced apart pair of laterally extending non-elastic straps 32 and 34. The end portions of the upper lateral strap 32 comprise the attachment points 12 and 15 for the proximal ends of the shoulder straps 6 and 8 respectively.

The end portions of the lower lateral strap 34 comprise the attachment points 19 and 21 for the proximal ends of the brisket straps 27 and 29 respectively. To provide longitudinal and diagonal elasticity to the chest pad 5 the lateral non-elastic straps 32 and 34 are interconnected by a pair of laterally spaced-apart longitudinally extending elastic bands 40 and 42. To stabilize the normally rectangular shape of the chest pad, a second pair of elastic bands 44 and 46 is disposed across the chest pad with each of the bands disposed diagonally across the chest pad area, their respective ends being anchored at the attachment points 15 and 17 and 19 and 21. The criss-crossed bands 44 and 46 allow for and stabilize diagonal distortion of the chest pad in response to cross pulling tension by one shoulder and the opposite leg.

To complete the preferred form of the chest pad 5 a porous and longitudinally elastic mesh jacket 50 surrounds the front and back of the rectangle formed by the non-elastic laterals 32 and 34 and the elastic side bands 40 and 42.

While the preferred form of elastic chest pad is shown and described, it is apparent that other forms of the elastic pad may be conceived in order to accomplish the objective of the invention to provide an elastically deformable and flexible central pad member that will reduce pressure points and will not impede free motion.

Figure 4:
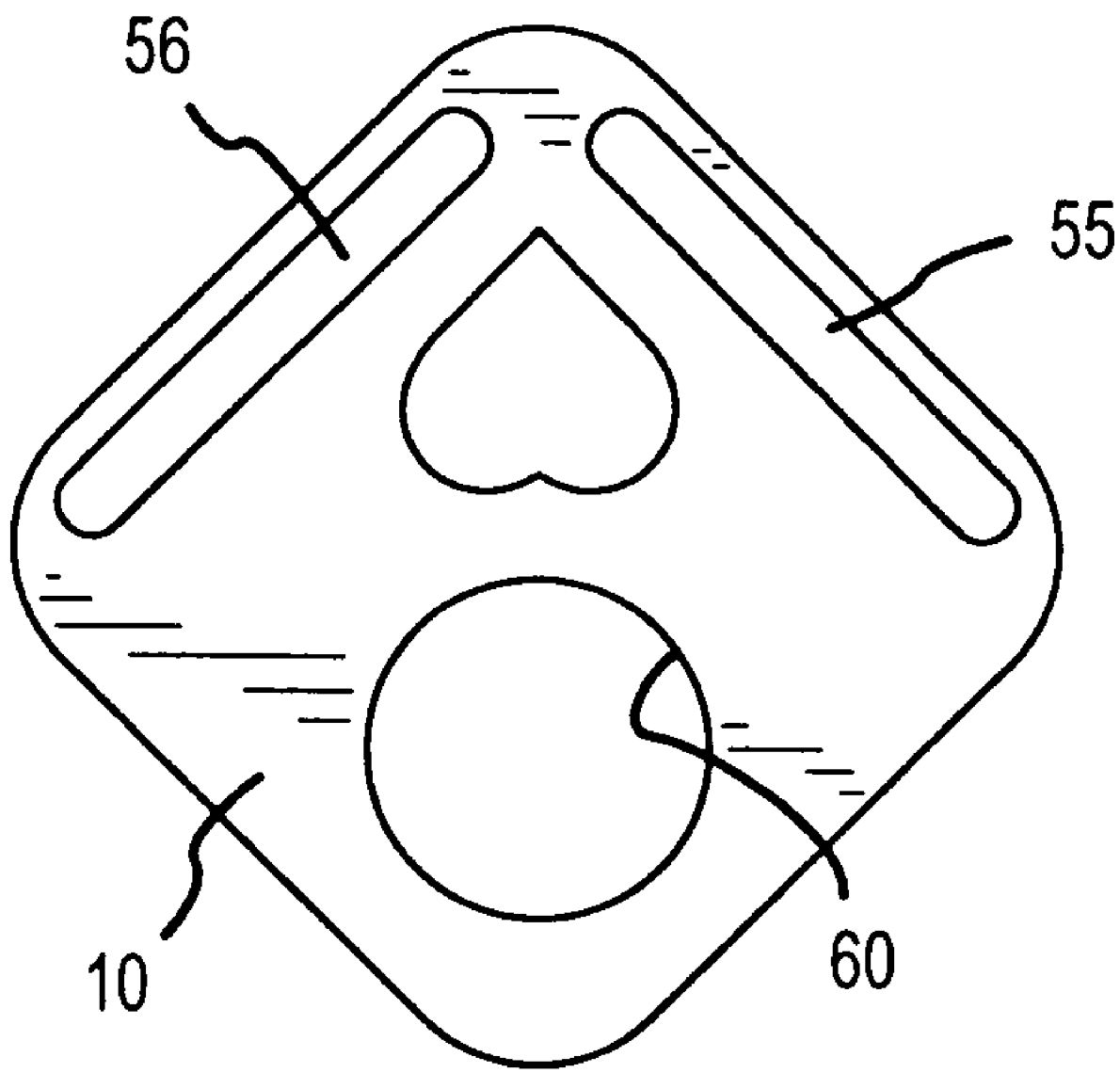
FIG. 4 is a plan view of the withers leash attachment plate that interconnects the distal ends of the shoulder straps and the distal loop of the brisket straps.

FIG. 4 illustrates a flat plate 10 that is one form of mechanism for uniting the brisket straps and shoulder straps at a common point over the withers of the dog. The distal ends of the shoulder straps are trained through spaced-apart slots 55 and 56 in the withers plate 10 and are then fold back and secured with length adjustment buckets 57 and 58. An aperture 60 in the withers plate 10 receives the distal loop 28 of the brisket straps 27 and 29 providing sliding movement of the distal loop 28 within the plate 10.

Figure 5:
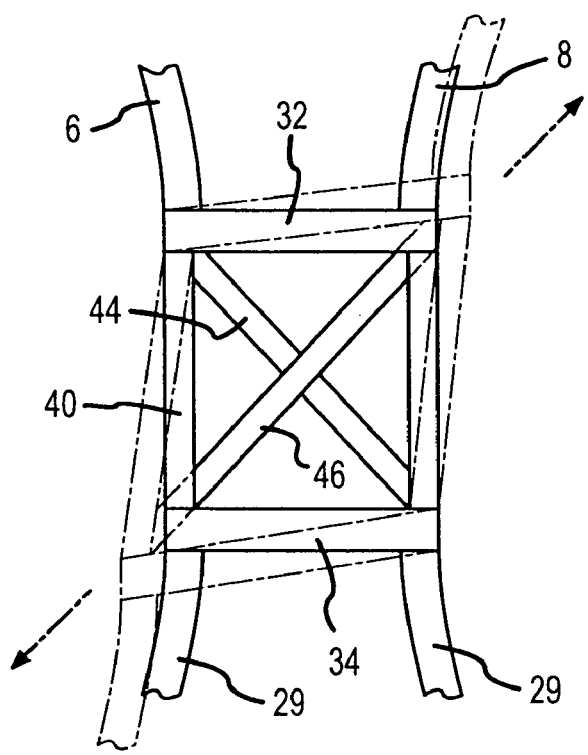
FIG. 5 is a fragmentary view of the bands comprising the chest pad showing in dotted lines the distorted form of the device in a first diagonal/longitudinal direction.
Figure 6:
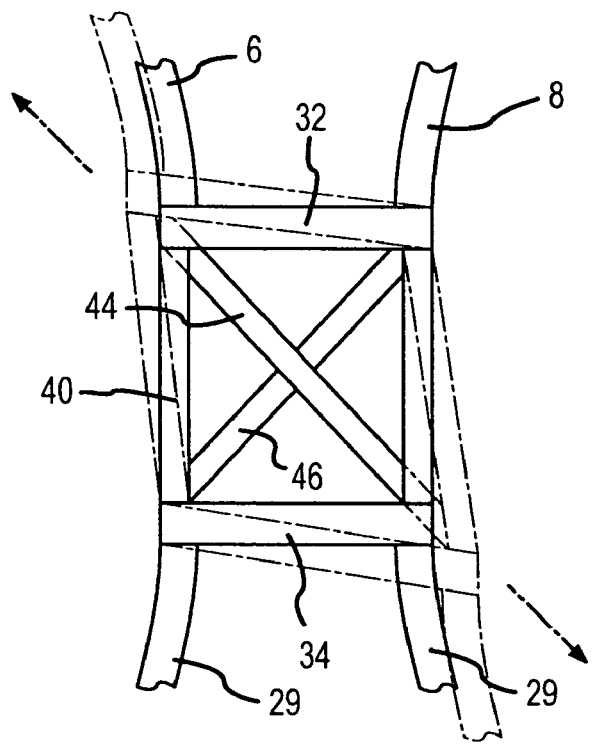
FIG. 6 is a fragmentary view of the bands comprising the chest pad showing in dotted lines the distorted form of the device in a second diagonal/longitudinal direction.

FIGS. 5 and 6 illustrate the available longitudinal and diagonal distortion of the chest pad 5 in order to accomplish the objects of the invention.

What is claimed is:

1. A small animal harness comprising,
   an elastically deformable animal chest piece having two laterally spaced apart upper attachment points and two laterally spaced apart lower attachment points,
   where the chest piece comprises,
      longitudinally spaced apart upper and lower laterally extending edge forming means respectively carrying the upper and lower attachment points, and
      means for elastically interconnecting the upper and lower laterally extending edge forming means,
   a pair of shoulder straps having proximal and distal ends where the proximal ends are respectively attached to the upper attachment points of the chest piece,
   a pair of brisket straps having proximal ends and a distal loop where the proximal ends are respectively attached to the lower attachment points of the chest piece,
   means adapted to be positioned over the animal's withers for forming a junction of the distal ends of the shoulder straps and the distal loop of brisket straps.

2. The harness of claim 1 where the means for elastically interconnecting comprises,
   a first pair of spaced apart elongated elastic bands interconnecting the upper and lower laterally extending edge forming means,
   a second pair of elongated elastic bands interconnecting the upper and lower laterally extending edge forming means and disposed in an X configuration.

3. The harness of claim 2 where the means for elastically interconnecting further comprises,
   a porous elastic jacket surrounding the first and second pairs of elastic bands.

4. A small animal harness comprising,
   an elastically deformable animal chest piece having two laterally spaced apart upper corners and two laterally spaced apart lower corners,
   where the chest piece comprises,
      spaced apart non-elastic members defining the upper and lower perimeters of the chest piece,
      at least one elastic member interconnecting the non-elastic members,
   a pair of shoulder straps having proximal and distal ends where the proximal ends are respectively attached to the upper corners of the chest piece and the distal ends are interconnected,
   a pair of brisket straps having proximal ends and a distal loop where the proximal ends are respectively attached to the lower corners of the chest piece,
   means adapted to be positioned over the animal's withers for interconnecting the distal ends of the shoulder straps, said means having an aperture through which the distal loop of the brisket straps is trained for slidable movement therethrough.

5. A small animal harness comprising,
   an elastically deformable animal chest piece having two laterally spaced apart upper corners and two laterally spaced apart lower corners,
   where the chest piece comprises,
   spaced apart non-elastic members defining upper and lower perimeters of the chest piece and being integral with the respective upper and lower corners of the chest piece,
   a first pair of spaced apart and mutually parallel elastic bands interconnecting the non-elastic members,
   a pair of shoulder straps having proximal and distal ends where the proximal ends are respectively attached to the upper corners of the chest piece and the distal ends are interconnected,
   a pair of brisket straps having proximal ends and a distal loop where the proximal ends are respectively attached to the lower corners of the chest piece,
   means adapted to be positioned over the animal's withers for interconnecting the distal ends of the shoulder straps, said means having an aperture through which the distal loop of the brisket straps is trained for slidable movement therethough.

6. The harness of claim 5 and further including,
   a second pair of elastic bands interconnecting the non-elastic members in a diagonal configuration from the upper and lower corners of the chest piece.

* * * * *